Nov. 11, 1969  S. J. YERKINS  3,477,112
METHOD FOR FORMING TORCH TIPS
Original Filed Jan. 7, 1966
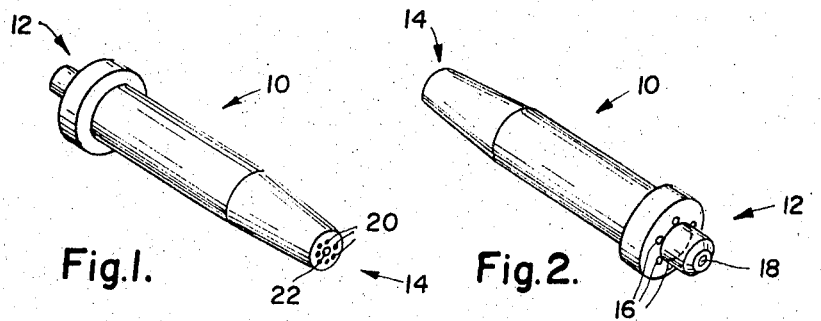
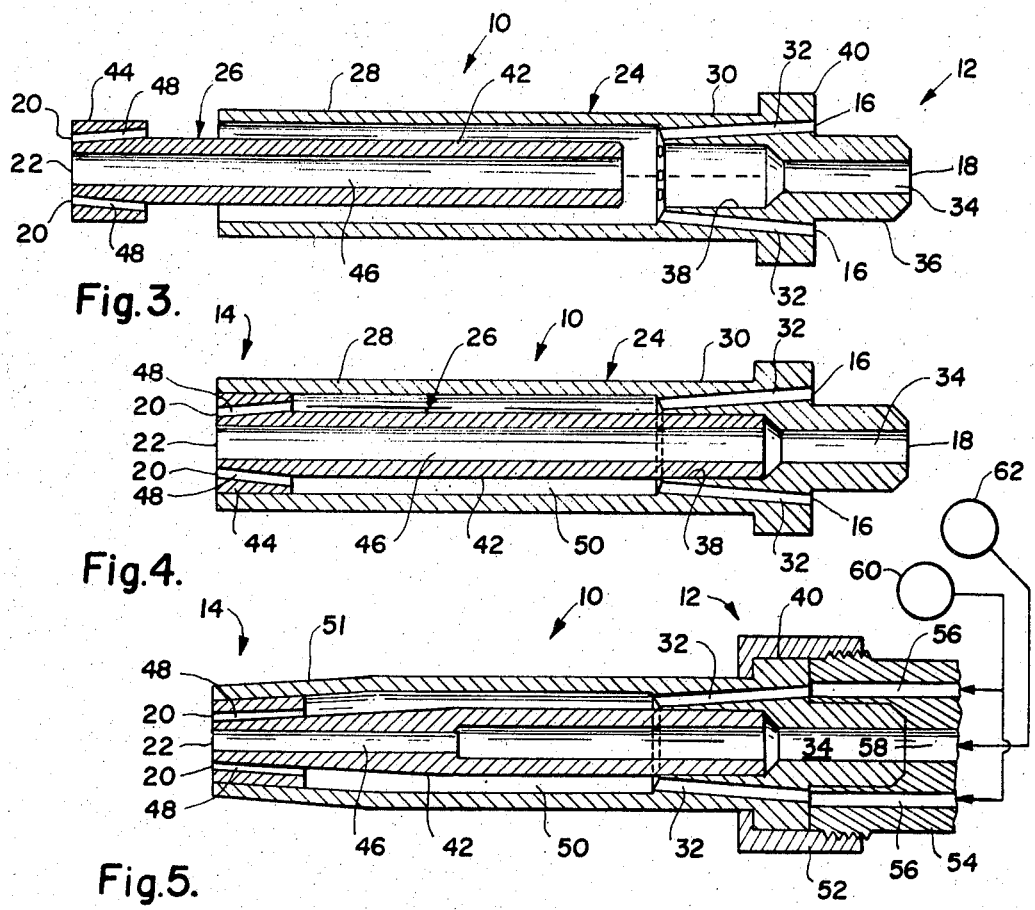
INVENTOR.
STEPHEN J. YERKINS
BY
ATTORNEY

United States Patent Office 3,477,112
Patented Nov. 11, 1969

3,477,112
METHOD FOR FORMING TORCH TIPS
Stephen J. Yerkins, Glenshaw, Pa., assignor to Goss Gas, Inc., Glenshaw, Pa., a corporation of Pennsylvania
Original application Jan. 7, 1966, Ser. No. 519,376, now abandoned. Divided and this application Mar. 8, 1968, Ser. No. 711,710
Int. Cl. B21d 53/00; B21k 29/00
U.S. Cl. 29—157      4 Claims

ABSTRACT OF THE DISCLOSURE

Described is a method for forming tips of the type adapted to burn mixtures of fuel gases for heating and cutting metals, characterized in that the tips are formed from two separate integral pieces which facilitate elimination of much of the drilling required with conventional one-piece tips.

Cross-references to related applications

This application is a division of copending application Ser. No. 519,376, filed Jan. 7, 1966, and now abandoned.

Background of the invention

Basically, torch tips are constructed to provide one or more heating jets and an auxiliary jet. The heating jets burn oxygen and acetylene, oxygen and hydrogen or oxygen and any other gas which will burn in the presence of oxygen and which will provide sufficient heat. The auxiliary jet is usually a jet of pure oxygen.

Torch tips of the type described are usually formed from a single piece of a copper alloy. They have a relatively large central bore which provides the auxiliary jet and a plurality of relatively small bores which are arranged, for example, in a circle about the central bore and provide the aforementioned heating jets. Inasmuch as the central bore has a relatively large diameter, it is easily drilled without any major problems.

The small bores, on the other hand, have a relatively small diameter and therefore present certain problems which the present invention seeks to overcome. For example, the small bores are relatively long, extending substantially the entire length of the torch tip. These bores are drilled in two steps, that is, each small bore is started by drilling, for example, through the back end of the torch tip approximately halfway through the torch tip. Each small bore is completed by drilling through the front end of the torch tip.

The drills used to drill the relatively small bores are relatively long and relatively thin and are rotated at about 10,000 revolutions per minute. Therefore, it is not unusual for the drill to break during the drilling operation. When a drill breaks, the incomplete torch tip is discarded since too much time would be involved in extracting the broken drill piece. Consequently, there results a certain amount of discarded workpieces which represents material losses as well as a loss in operator's time. Furthermore, the production rate is lowered since the speed of drilling through the workpieces must be slow enough so as not to break the drills.

Summary of the invention

As one object, the present invention provides a method for fabricating torch tips without the above-described disadvantages.

Still another object of the invention is to provide a method for forming a torch tip from two components which, when assembled, provide a torch tip which is indistinguishable from a torch tip formed from a single piece of material.

In accordance with the present invention, a torch tip is formed from a tubular housing having a back wall adapted for connection to sources of combustion gases and an insert which is inserted through the front end of the housing. This is accomplished by the steps of drilling passageways through a hub portion on the forward end of said insert, drilling passageways through the back wall of said tubular housing such that the passageways communicate with the interior of the housing near the periphery thereof, inserting said insert into the forward end of the tubular housing and forcing a shank portion on the insert into an axial bore formed in said back wall while fitting said hub portion into the open end of the tubular housing, and deforming the previously-open end of the housing radially inwardly to secure the insert within the housing and provide a gas-tight seal between the hub portion on the insert and the wall of the tubular housing.

As will become apparent, several advantages result from constructing a torch tip in accordance with the present invention. Briefly, there is a saving in material since the completed torch tip is formed from a smaller amount of material. Further, the material cut away from the starting workpiece during fabrication of the tubular housing and the insert, may be reclaimed for subsequent use. The inlet and outlet gas passageways are considerably shorter thereby eliminating substantially entirely all drill breakage and, hence, reducing the number of incompleted workpieces which are discarded. Finally, the production rate is considerably increased because the drilling time is reduced.

The above and other objects and advantages of the present invention will become apparent from the following detailed description by reference to the accompanying drawings, in which:

FIGURES 1 and 2 are isometric views illustrating a torch tip constructed in accordance with the present invention;

FIG. 3 is a longitudinal cross-sectional view illustrating a tubular housing and an insert of the torch tip of the invention;

FIG. 4 is a longitudinal cross-sectional view, similar to FIG. 3, illustrating the torch tip of the invention in a partially completed condition; and FIG. 5 is a longitudinal cross-sectional view, similar to FIG. 4, of a completed torch tip of the invention.

Referring now to FIGS. 1 and 2, there is illustrated a torch tip 10 formed in accordance with the present invention and having a back or gas receiving end 12 and a front or burning end 14.

As is conventional, in the back end 12 there is found a plurality of gas inlet openings 16 and a central gas inlet opening 18. A mixture of fuel gases, such as, oxygen and acetylene, oxygen and hydrogen or the like, is introduced into the gas inlet openings 16 while a pure gas, such as oxygen, is introduced into the central gas inlet opening 18.

As is conventional, in the front end 14 there is found a plurality of gas outlet openings 20 and a central gas outlet opening 22. The fuel gas mixture introduced into the gas inlet openings 16 will issue from the gas outlet opening 20 as the aforementioned heating jets. The pure gas introduced into the central gas inlet opening 18 will issue from the central gas outlet opening 22 as the aforementioned auxiliary jet. From its outward appearance, torch tip 10 seems to be a conventional torch tip formed from a single piece of a suitable copper alloy. However, this is not the case as will now be described.

Referring now to FIG. 3, the torch tip 10 is, in reality, formed from two components, namely, an elongated housing 24 and an elongated insert 26.

The elongated housing 24 consists of a tubular front portion 28 projecting from a relatively thick back wall 30. A plurality of gas inlet passageways 32, corresponding with the gas inlet openings 16, extend axially through the wall 30 and communicate with the interior of the tubular front portion 28. A central gas inlet passageway 34, corresponding with the gas inlet opening 18, extends axially through a cylindrical portion 36 which is formed integrally with the wall 30. The cylindrical gas inlet passageway 34 opens into an axial bore 38 formed in the wall 30.

The back end 12 of the housing 24 is provided with a radial flange 40 which along with the cylindrical portion 36 adapts the back end 12 for connection to a source of fuel gas. It should be noted at this time that the particular configuration of the back end 12 forms no part of the present invention and that the back end 12 may have any one of the many configurations which adapts the torch tip 10 for connection to a source of fuel gas.

The elongated insert 26 consists of a stem 42 which terminates at its front end in an annular hub 44. The insert 26 is provided with a central gas passageway 46 which extends completely through the insert 26. One end of the central gas passageway 46 corresponds with the gas outlet opening 22. The annular hub 44 is provided with a plurality of gas outlet passageways 48 which extend completely therethrough. One end of the gas outlet passageways 48 corresponds with the gas outlet openings 20.

It should be noted that the length of the gas inlet passageways 32 of the housing 24 and the gas outlet passageways 48 of the insert 26 are relatively short passageways. Consequently, these openings may be rapidly and easily drilled without fear of breaking the drill. Therefore, the number of workpieces which must be discarded due to drill breakage is greatly reduced. Furthermore, their short length decreases the drilling time and consequently increases production.

Referring now to FIG. 4, the insert 26 is introduced into the tubular front portion 28 of the housing 24. The stem 42 of the insert 26, has an outer diameter which is substantially equal to the inner diameter of the axial bore 38 provided in the wall 30. Consequently, the inner end of the stem 42 must be forced into the axial bore 38, the overall arrangement being such that a gas-tight seal between the outer surface of the stem 42 and the inner surface of the axial bore 38 is provided. The outer diameter of the annular hub 44 is slightly less than the inner diameter of the tubular portion 28 whereby the annular hub 44 will readily fit within the tubular portion 28. As can be seen in FIG. 4, the outer face of the insert 26 is flush with the outer annular face of the tubular front portion 28.

The outer surface of the stem 42, the inner face of the annular hub 44, the inner surface of the tubular portion 28, and the inner end of the wall 30, cooperate to define an annular gas passageway 50. The overall arrangement is such that the gas inlet passageways 32 of the wall 30, introduce a gas mixture into the annular gas passageway 50 and the gas mixture is discharged from the annular gas passageway 50 through the gas outlet passageways 48 provided in the annular hub 44.

To complete the fabrication of the torch tip 10, the front end 14 of the housing 24 is deformed inwardly to secure the insert 26 within the housing 24 and to provide a gas-tight seal between the annular hub 44 and the tubular portion 28. The inward deformation of the front portion 14 is preferably accomplished by a swaging process. Prior to swaging the front end 14 and as is conventional, wires (not shown) of a predetermined diameter are inserted into the gas outlet passageways 48 of the annular hub 44 and the central gas passageway 46 of the stem 42. The wires introduced into the passageways 46, 48 allow these passageways to be reduced to a preselected diameter during the swaging process. At the completion of the swaging process, the torch tip 10 will have a tapered front end 51, as illustrated in FIG. 5. If desired, the front face of the torch tip 10 may be polished to the point where it is impossible to detect that the torch tip 10 is actually formed from two components.

The back end 12 of the torch tip 10 may be connected to two sources of fuel gases, for example, by means of an internally threaded cap 52 which fits over the radial flange 40 and is threaded onto a conduit or adapter head 34 having outer gas passageways 56 communicating with the gas inlet passageways 32 and an inner gas passageway 58 communicating with the central gas inlet passageway 34. As an example, a source, indicated schematically at 60, may provide a mixture of oxygen and acetylene to the outer passageways 56 of the conduit 54. A second gas source, indicated schematically at 62, would introduce pure oxygen into the inner gas passageway 58 of the conduit 54. As mentioned above, the particular configuration of the rear portion 12 and the means illustrated by which the torch tip 10 is connected to the gas sources 60, 62 do not form a part of the invention. The mode of connection to the sources 60, 62 is included solely for the purpose of illustration.

Although the invention has been shown in connection with one specific embodiment, it will be readily apparent to those skilled in the art that various changes in form and arrangement of parts may be made to suit requirements without departing from the spirit and scope of the invention.

I claim as my invention:

1. In the method for forming a torch tip from two elements, one of said elements comprising a tubular housing open at one end and having at its other end a back wall, the other of said elements comprising a tubular member having a shank portion and an integral hub portion at one end of the shank portion; the steps of drilling passageways through the hub portion of said tubular member along the axis of said shank portion, drilling passageways through the back wall of said tubular housing such that the passageways communicate with the interior of the housing near the periphery thereof, inserting the stem of said tubular member into the open end of said tubular housing and forcing the forward end of said stem into an axial bore formed in said back wall while fitting said hub into the open end of said tubular housing, and deforming said open end of the tubular housing radially inwardly to secure said tubular member within the housing and provide a gas-tight seal between said hub and the wall of the tubular housing.

2. The method of claim 1 wherein said open end of the tubular housing is deformed radially inwardly by swaging.

3. The method of claim 1 wherein the passageways formed in said hub portion are drilled at an angle to the longitudinal axis of the torch tip.

4. The method of claim 1 including the step of forming said axial bore in the back wall with a substantially smooth peripheral surface, and forming said stem with a smooth surface on its forward end whereby the forward end of the stem slides into said axial bore and is held therein by the reformed open end of the tubular housing in compressional sealing engagement with said hub.

References Cited

UNITED STATES PATENTS

| 1,568,331 | 1/1926 | Harris. | |
| 1,941,467 | 1/1934 | Fausek et al. | 239—424 |
| 1,971,287 | 8/1934 | Walker | 239—424 |
| 2,353,318 | 7/1944 | Scheller | 29—157 X |

JOHN F. CAMPBELL, Primary Examiner

D. C. REILEY, Assistant Examiner

U.S. Cl. X.R.

29—445, 511, 516; 239—424.5